(12) United States Patent
Elmore et al.

(10) Patent No.: US 9,753,928 B1
(45) Date of Patent: Sep. 5, 2017

(54) SYSTEM AND METHOD FOR IDENTIFYING DELIMITERS IN A COMPUTER FILE

(71) Applicant: Trifacta, Inc., San Francisco, CA (US)

(72) Inventors: Aaron J. Elmore, Goleta, CA (US); Adam E. Silberstein, Sunnyvale, CA (US); Joseph M. Hellerstein, Berkeley, CA (US); Sean Kandel, San Francisco, CA (US)

(73) Assignee: Trifacta, Inc., San Francisco, CA (US)

( * ) Notice: Subject to any disclaimer, the term of this patent is extended or adjusted under 35 U.S.C. 154(b) by 216 days.

(21) Appl. No.: 14/491,953

(22) Filed: Sep. 19, 2014

Related U.S. Application Data

(60) Provisional application No. 61/880,019, filed on Sep. 19, 2013.

(51) Int. Cl.
*G06F 17/30* (2006.01)

(52) U.S. Cl.
CPC .................. *G06F 17/3007* (2013.01)

(58) Field of Classification Search
CPC .................................................. G06F 17/3007
USPC ........................................................ 707/748
See application file for complete search history.

(56) References Cited

U.S. PATENT DOCUMENTS

| | | | |
|---|---|---|---|
| 8,700,997 B1* | 4/2014 | Yang | G06F 17/273 715/234 |
| 8,868,482 B2* | 10/2014 | Murthy | G06F 17/30914 707/601 |
| 2003/0120651 A1* | 6/2003 | Bernstein | G06F 17/30569 |
| 2005/0114405 A1* | 5/2005 | Lo | G06F 17/30914 |
| 2005/0144556 A1* | 6/2005 | Petersen | H03M 7/30 715/242 |
| 2005/0154979 A1* | 7/2005 | Chidlovskii | G06F 17/30914 715/237 |
| 2007/0185868 A1* | 8/2007 | Roth | G06F 17/30911 |
| 2008/0027895 A1* | 1/2008 | Combaz | G06F 17/30699 |
| 2008/0148147 A1* | 6/2008 | Poston | G06F 17/30716 715/273 |
| 2008/0183696 A1* | 7/2008 | Lagunas | G06F 17/2735 |
| 2012/0011084 A1* | 1/2012 | Gulwani | G06F 17/2282 706/12 |
| 2012/0087267 A1* | 4/2012 | Norair | H04W 76/023 370/252 |
| 2013/0325907 A1* | 12/2013 | Montes de Oca | G06F 17/30914 707/811 |
| 2014/0280285 A1* | 9/2014 | Quinion | G06F 17/30646 707/766 |

* cited by examiner

*Primary Examiner* — Rehana Perveen
*Assistant Examiner* — Hicham Skhoun
(74) *Attorney, Agent, or Firm* — Fenwick & West LLP

(57) ABSTRACT

A system and method automatically identifies any or all of potential row, column and string delimiters in a file in which such delimiters are unknown to the program making such identification.

18 Claims, 5 Drawing Sheets

SYSTEM AND METHOD FOR IDENTIFYING DELIMITERS IN A COMPUTER FILE

RELATED APPLICATION

This application claims the benefit of U.S. Provisional Patent Application Ser. No. 61/880,019 entitled, "Method and Apparatus for Identifying Delimiters in a Computer File" filed by Aaron J Elmore, Adam E. Silberstein, Joseph M. Hellerstein and Sean Kandel on Sep. 19, 2013, having the same assignee as the present application and is hereby incorporated by reference in its entirety.

FIELD OF THE INVENTION

The present invention is related to computer software and more specifically to computer software for computer file delimiter identification.

BACKGROUND OF THE INVENTION

Data in computer files is frequently organized into rows and columns. Because computer files are just one long continuous string of bytes, the data is separated by row and column delimiters, which are typically different from one another, to indicate breaks between columns and rows. Thus, a comma separated file will use commas between the columns of each row, and a different delimiter between the rows. Between the delimiters are the data in the file.

Some data itself may use the delimiter characters for purposes other than to delimit a new column or row. To allow data to use the delimiter characters for other purposes, a set of string delimiters is used to indicate that, between the string delimiters, characters that correspond to row or column delimiters are not being used as delimiters, but are part of the data in the file. String delimiters are typically used in pairs, with a starting delimiter and an ending delimiter such as [this string] with brackets used as the delimiter. The starting and ending delimiters may be different or may be the same, such as 'this string' which uses single quotes for both delimiters.

Because different files may have different delimiters, to allow a program to use files from many sources of which the delimiters may be different and unknown, it can be helpful to identify the delimiters being used by a particular file. What is needed is a system and method that can automatically identify delimiters in a file.

SUMMARY OF INVENTION

A system and method copies a portion of the file, starting from the beginning of the file, and applies various delimiter schemas against the copy of the file to create tokenized versions of the copy. One or more characters matching a character corresponding to a token are replaced by a token identifier of the corresponding token in the tokenized copy. The delimiter schemas each contain the same one or more candidate row and column delimiters of one or more characters, and any of them in the copy are converted to tokens in the tokenized versions. For example, candidate row delimiters could include a comma and a tab character, and candidate column delimiters could include a line feed and a carriage return and line feed pair, and if there were three schemas, all of the schemas would contain these same delimiters. Delimiter schemas may also contain data descriptions that identify groups of characters as data and have a preference that causes characters matching a description that also contain potential delimiters to be recognized as data instead of delimiters.

Each schema also contains a different set of potential string delimiters and one contains no string delimiters. For example, a string delimiter may include a single quotes character and another schema includes the double quotes character. When creating the tokenized copy, the actual string delimiters, if any, of the schema as well as the bytes between them, found in the copy, are not included in the tokenized version, just the token representing the delimiter or pair of delimiters. So, for example, using a string delimiter of a dash character with a delimiter identifier of <delimiter7>, the sequence "—This is a string—" could be replaced with <delimiter7> in the tokenized copy. Other row and column delimiters could similarly be replaced by their delimiter identifiers in the tokenized version.

A most commonly found repeating pattern of tokens of a given size is identified in each tokenized version, for each of every size 2 through N, which may be user supplied. So, for example, if the most commonly repeating pattern of delimiters in a tokenized copy is two (optionally specific) column delimiters followed by one (optionally specific) row delimiter, that pattern is identified as a most commonly found repeating pattern. A limit on the effort used to identify the commonly found repeating patterns may be used, such as by restricting the patterns to those found in a first N lines of the file, using only a certain amount of time to find them or locating the first N patterns that repeat at least a threshold number of times. The size is then used to generate a score, by using a window equal to whatever size was used to identify the pattern, starting at the beginning of the tokenized version of file and computing the Levenshtein distance of the pattern to the tokens in the window. If the distance is zero, the beginning of the window is moved just past the previous end of the window, and otherwise, the window is moved one token to the right. The process is then repeated over the tokenized version as many times as necessary to reach the end of the tokenized version. In another embodiment, the process is repeated a number of times, but not necessarily to the end of the file, or the process is repeated until a certain amount of time has elapsed. Levenshtein distances and the window tokens to which they correspond, may be cached to speed computation of such distances.

A score may be generated from the Levenshtein distances thus computed, that causes a file containing the pattern repeated exactly with no gaps to have the highest score and a file that has the pattern only repeated a very small number of times to have the lowest score. Additionally, the score may be adjusted to favor scores corresponding to smaller size patterns. Other factors may be used to compute the score, such as setting the score to zero if the pattern does not have a terminator delimiter that is unique to the pattern, and increasing the score if the schema corresponding to the tokenized version does not have string delimiters above those that do, when the score for a different schema is equal for a given size.

The highest score above a threshold for which the pattern has a unique terminator delimiter, is identified, with ties broken in favor of patterns located earlier in the file or another criteria, and then, in favor of the score for a schema without a string delimiter for a given size over scores of other schemas for that size. Other tuning parameters may be used to bias the score in one way or another. If such a score does exist, the terminator character or characters of the pattern or patterns corresponding to the score is used as the row delimiter for the file, and the most common other character in the pattern corresponding to the score is used as the column delimiter for the file. If there was a string delimiter pair in the schema corresponding to the score, the string delimiter pair in the schema is used for the string delimiter for the file. The file is then parsed using the delimiters.

In one embodiment, multiple delimiter pattern and string delimiter options are identified and presented to the user. In such embodiment, the highest N (e.g. 5) scores above a threshold for which the pattern has a unique terminator delimiter of one or more tokens, are identified, with ties broken in favor of patterns located earlier in the file, and then, in favor of the score for a schema without a string delimiter for a given size over scores of other schemas for that size. Other numbers of delimiter patterns may be used. The system and method shows the delimiter patterns and string delimiters corresponding to each score to the user in descending order of score and allows the user to choose the schema of delimiters the user feels is most likely to be successful. In such embodiment, a few lines of the copy of the file may be displayed to the user, in original form, and separated into columns and rows, with strings identified as strings, using each of the delimiter patterns and string delimiters identified to the user as described above. When the user chooses the delimiter pattern corresponding to a score, the system and method parses the file as described above using the selected delimiter pattern and corresponding string pattern.

If no such score exists, an alternate technique is used to identify the delimiters. Potential row, column and string delimiter pairs are counted (string delimiters are counted without regard for the other string delimiters, and optionally, row and column delimiters are counted without regard for any string delimiters, and the highest count of the row delimiters is compared to the highest count of the column delimiters. If the count of the column delimiters is at least a threshold number of (e.g. three times) the count of the row delimiters, the highest counted row and column delimiters are used as the row and column delimiters for the file, and otherwise, no delimiters are assigned to the file. If the highest counted string delimiter pair has a count that is significantly greater than the second highest counted string delimiter pair, the highest counted string delimiter pair is assigned to the file and otherwise, no string delimiters are assigned to the file. The file is then parsed using the assigned delimiters.

DETAILED DESCRIPTION OF A PREFERRED EMBODIMENT

Figure 1:
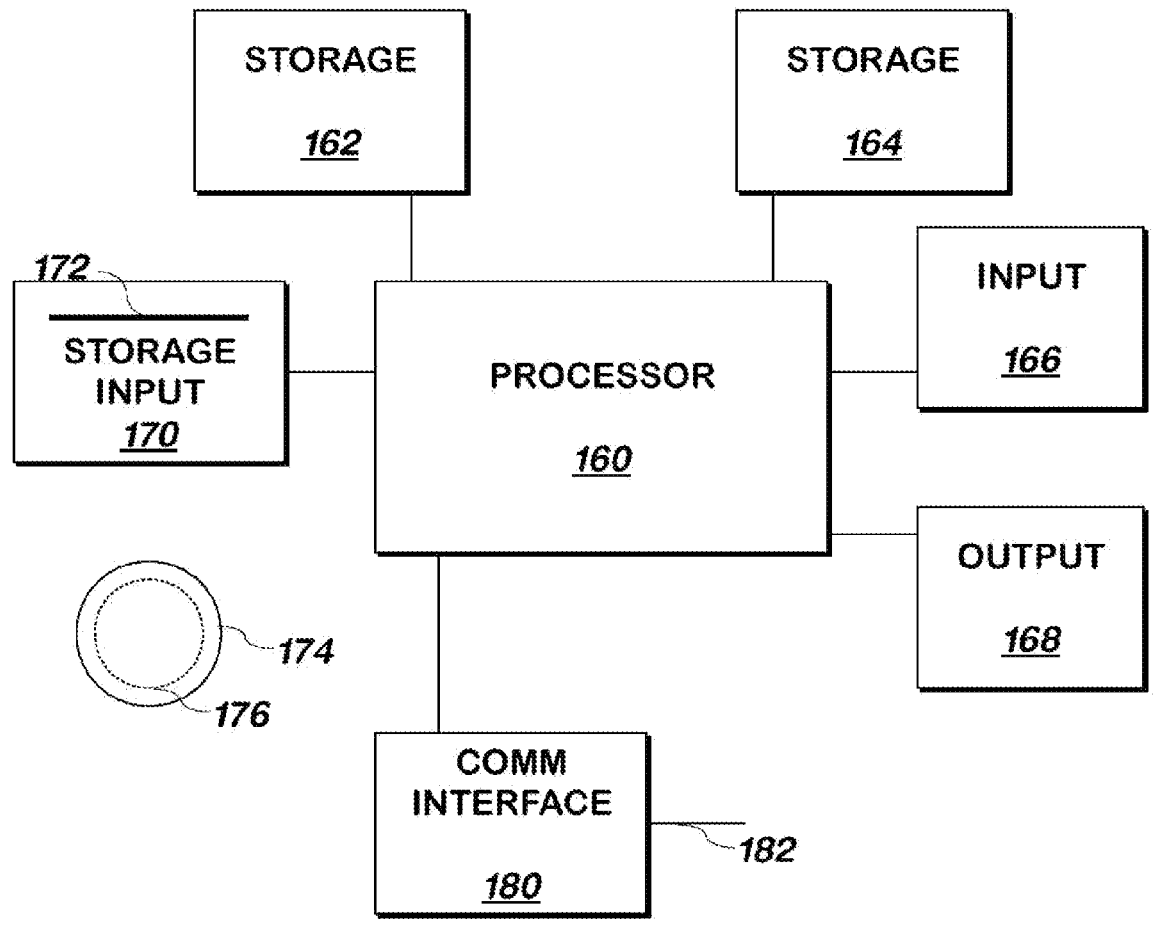
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Texas running a version of the WINDOWS operating system (such as XP, VISTA, or 7) commercially available from MICROSOFT Corporation of Redmond Washington or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
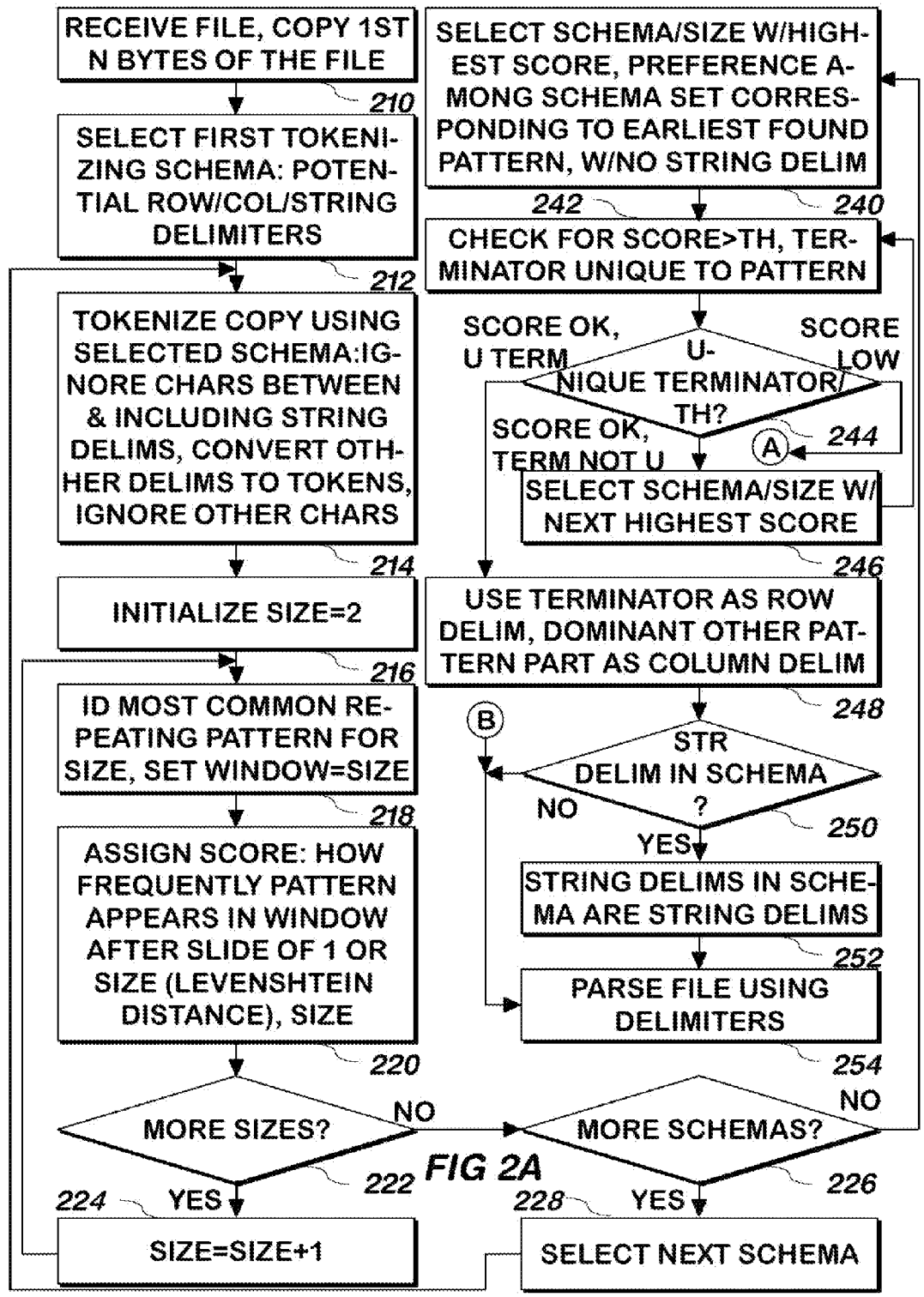
FIG. 2, consisting of FIGS. 2A and 2B, is a flowchart illustrating a method of identifying delimiters in a file according to one embodiment of the present invention.
FIG. 2C is a flowchart illustrating a method of computing a score of FIG. 2B according to one embodiment of the present invention.
Figure 2B:
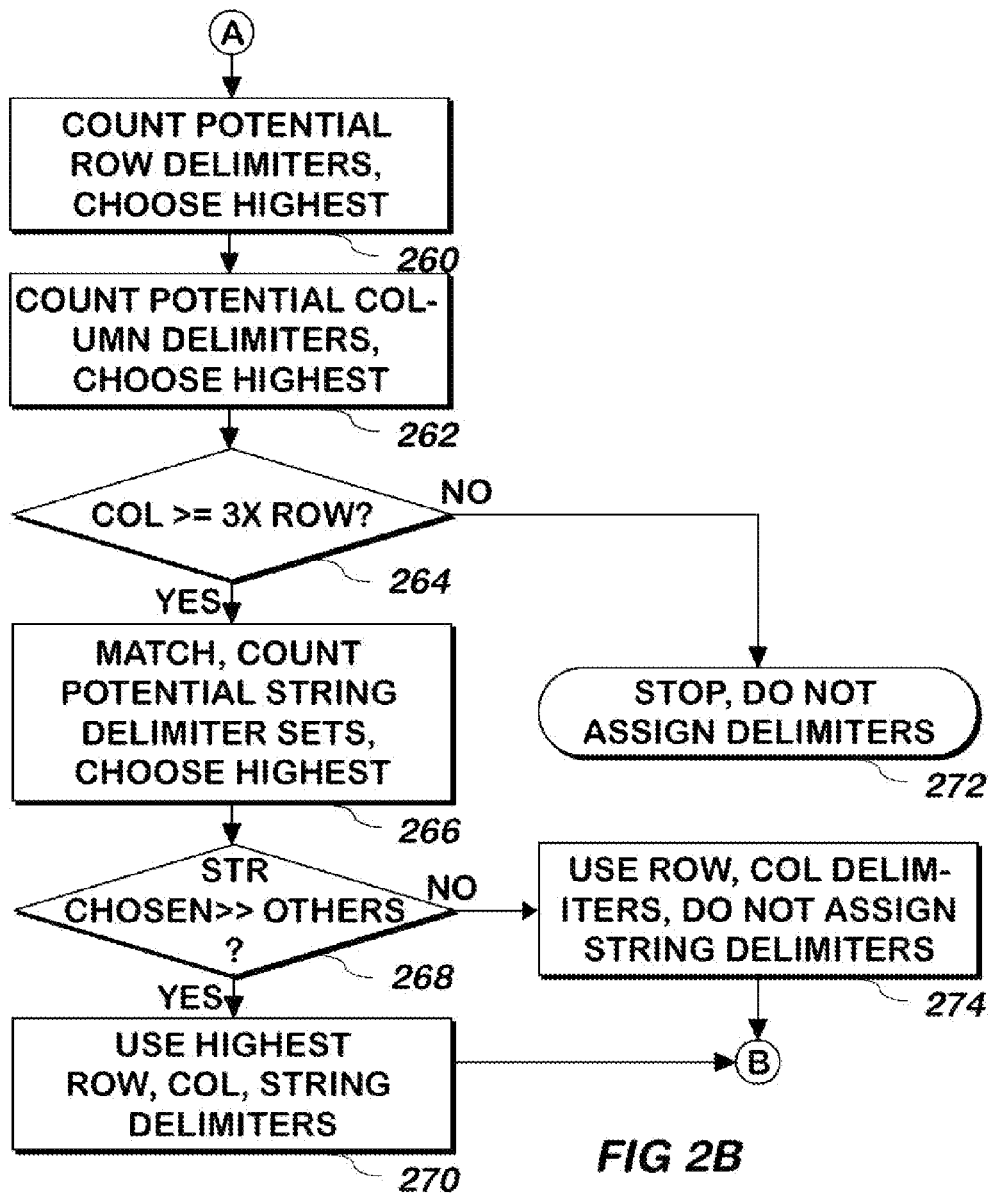

FIG. 2, consisting of FIGS. 2A and 2B is a flowchart illustrating a method of identifying row delimiters, column delimiters, and string delimiters from a file in which the delimiters are unknown. The file is received and the first N bytes of the file are copied 210. In one embodiment, N=5000, though other values may be used. Although a copy of the file is described herein, the original file may be used in place of a copy.

A first tokenizing schema is selected 212. Each tokenizing schema contains one or more characters identifying potential row delimiters (e.g. Carriage Return or Carriage Return and Line Feed), one or more characters identifying potential column delimiters (e.g. commas or tabs), and either a pair of string delimiters, or no string delimiters, with each tokenizing schema differing by the string delimiter pair. In one embodiment, one or more characters may correspond to a token, and one or more tokens may correspond to a delimiter, such as a row delimiter. A string delimiter pair contains an opening delimiter and a closing delimiter, which may be different but related, such as '[' and ']' or may be the same, such as '"' and '"'. In one embodiment, column delimiters need not be homogeneous. Thus, '[' can be a column delimiter as can ']', so that the characters could delimit a column by surrounding them, as in "[date]", and other columns in the same file may be delimited with a different one or more characters, such as commas.

In one embodiment, the tokenizing schemas contain descriptions that identify certain recognizable data forms as data, and the recognition of such forms will take precedence over the row and column delimiters. For example, a series of numbers separated by commas, and with no spaces, may be identified as a numeric data value that has commas as separators. Other data tokens may be used for dates, and character strings without string delimiters. When tokenizing the file copy, the numbers and commas will be represented by a "numeric data" token, and the commas will not be recognized as column separators. In one embodiment, schemas with and without these data tokens may be used.

The copy of the file is tokenized 214 using the selected schema to produce a tokenized version of the copy of the file. To tokenize the copy, in one embodiment, the file is scanned starting with the first character in the copy of the file, and for each character that matches one of the potential row or column delimiters in the tokenizing schema, a unique token corresponding to the delimiter is added to a tokenized version of the copy, replacing the matching character in the file. Other characters are ignored for the schema in which no string delimiters are included. In the other schemas containing a string delimiter pair, characters between opening and closing string delimiters do not cause a token to be generated in the tokenized version of the copy, even if they match a potential row or column delimiter. Other conventional methods of creating a tokenized version of the file may be used. Although the description herein has the tokenized copies produced one at a time, in another embodiment, all tokenized copies are produced at the same time in a single pass of the file. However, for purposes of a simpler description, they are described as being made one at a time.

A size is initialized, for example to a value of two 216. The tokenized version of the file is used to identify the most commonly found repeating pattern of tokens having a number of tokens equal to the current value of the size, and a window is identified equal to the size 218. In one embodiment, the most commonly found repeating pattern may not be the repeating pattern that is most common in the file, as the attempt to find the most commonly found repeating pattern may not be exhaustive. In one embodiment, only a limited number of patterns are identified or another limit on the attempt to find them is enforced, such as limiting an amount of time used to locate them or locating the most commonly repeating pattern in a subset of the file, such as the first third.

Figure 2C:
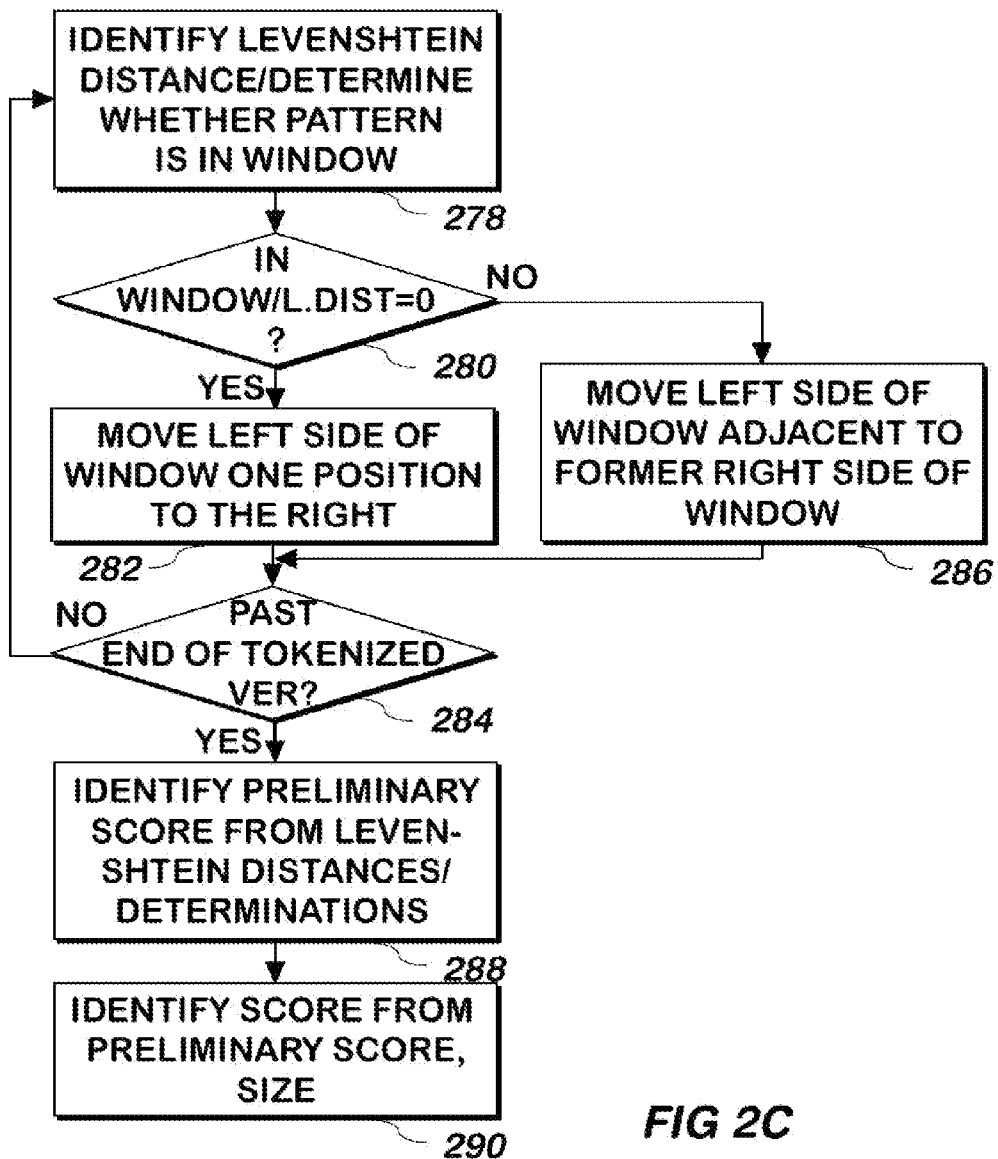

A score is assigned to the pattern for the tokenized copy, and the size 220. Referring now to FIGS. 2B and 2C, To compute the score, a Levenshtein distance is identified using the tokenized copy, the most common repeating pattern identified, and the window is identified, by initializing the window at the start of the tokenized copy and having a length of the size, identifying if the most common repeating pattern is in the window, assigning a Levenshtein distance to the tokens in the window and the pattern (e.g. if the pattern is found in the window, the distance is zero, and otherwise it is equal to the smallest number of tokens needed to change to cause the tokens in the window to be identical to the pattern) 278, and if the distance is zero 280, sliding the window to the character position immediately past the window 286, and repeating the process at step 278 if the new window would not extend past the end of the tokenized version of the file 284. If such pattern is not found in the window (e.g. the distance is greater than zero) 280, the window is slid to the right one character or token position 282 and the process repeats at step 278 if the new window would not extend past the end of the tokenized version of the file 284. The window is a portion of the current tokenized version of the file, defined by a starting point that defines the left side of the window and its size which is added to the left side of the window to define the right side of the window. In one embodiment, a token counts for one unit of the size; and any other non-tokenized characters may count for one unit of size, zero units of size or another measure of units. In one embodiment, the process is repeated as described above until the entire tokenized version of the copy of the file has been processed in this manner. In another embodiment, the process is repeated only for a certain amount of time, or to a certain point in the tokenized version or for a certain number of comparisons. The most recently computed N Levenshtein distances may be cached with the tokens in the window to allow for faster identification of such distances by first checking the cache and using the value in the cache if the tokens in the window match that in the cache and computing the Levenshtein distance otherwise.

Referring again to FIG. 2B, the Levenshtein distances are converted to a preliminary score using a function of all of the Levenshtein distances computed, such that if the pattern was perfectly repeating, the preliminary score would be higher than if the pattern were only found a low number of times, in which case the preliminary score would be lower. The Levenshtein distances need not actually be assigned, as a determination as to whether the Levenshtein distance is zero or not may be made in its place (e.g. whether the pattern is in the window or not), and the preliminary score may be made as a function of these determinations. Once the preliminary score is computed, it may be incorporated into a score by applying a function to the preliminary score to cause it to result in a higher score for smaller sizes, and lower for larger sizes. The score may be stored with an identifier of the schema, the size, and the most common repeating pattern identified as described herein. As noted herein, the score may have other components to cause the most accurate schema and smallest size that have other desirable features described herein to have the highest score.

In one embodiment, sizes may span a range of two to N, where N is a user selectable number, for example, between 80 and 100 to balance accuracy with latency. Such number may be received as part of step 210. If there are more sizes 222, the size is incremented 224, and the method continues at step 218 using the newly incremented size.

Otherwise, 222 if there are more schemas 226, the next schema is selected 228 and the method continues at step 214 using the newly selected schema. In this manner, each pair of schema and size is assigned a score and pattern of tokens, each token corresponding to one or more characters. If there are no more schemas 226, the method continues at step 240.

At step 240, the pattern for the schema and size with the highest score is selected, with ties broken in favor of a schemas corresponding to patterns found earlier in the file, and then to the schema of the same size with no string delimiter. In one embodiment, the score assigned in step 220 is assigned to cause such schemas to have a higher score.

The score is checked 242 to ensure it is greater than a threshold, and to ensure that the repeating pattern identified in step 218 for such schema and size contains a terminator token or set of tokens that is unique to the pattern (e.g. the terminator token appears in the pattern only as the last character in the pattern or as a unique sequence of the last three tokens, none of which appear elsewhere in the same pattern or the sequence is not found in elsewhere in the pattern). Patterns without such a unique terminator token or tokens may be assigned a score below the threshold, such as zero, in which case the check need not be performed at this point.

An example of a pattern of characters in which the terminator character is not unique is the pattern ', , , ,', because for all combinations of terminator characters of 1-3 characters, at least one such character is also part of the remainder of the pattern. An example of a pattern of a terminator delimiter that is unique to the pattern is the pattern ', , <CR><LF>', where <CR> is a carriage return character and <LF> is a line feed character, because none of the characters in the sequence <CR><LF> is part of the remainder of the pattern. The terminator delimiter may be selected by selecting one character, plus up to two more characters (or another threshold of characters) that do not appear in the remainder of the pattern. In the case of tokens, the tokens representing these characters may be used in the same manner.

If the selected pattern has a score below the threshold 244, the method continues at step 260 of FIG. 2B. If the score is above the threshold, but the terminator token is not unique to the pattern 244, the schema and size with the next highest score is selected 246, and the method continues at step 242. Such selection also breaks ties in favor of scores corresponding to patterns found earlier in the file, and schemas and sizes in which no string character pair is part of the schema over the other schemas with the same size. Other criteria may also or instead be used. If the prior selected schema is one with no string delimiter, other schemas with the same size as the prior selected schema need not be selected and may be skipped for the selection process of step 246, for example, by setting their score below the threshold as part of step 220, in one embodiment, though in other embodiments, no such skipping is performed.

In one embodiment, instead of breaking ties in favor of the above, such schemas and patterns are issued a higher score.

If the score is above the threshold, and the schema and size selected correspond to a most common repeating pattern with a unique terminator delimiter 244, the character or characters corresponding to the terminator token or tokens is used as the row delimiter for the file, and the character or characters corresponding to the most common other token, or to any other token, in the most commonly repeating pattern for the selected schema and size is used as the column delimiter for the file 248. If there is a string delimiter pair in the schema 250, the string delimiter pair in the schema is used as the string delimiter pair for the file 252. The file is parsed using the delimiters 254. If there is no string delimiter pair in the schema 250, the file is parsed without string delimiters, but using the other delimiters as described above.

The use of any delimiter in the pattern as a column delimiter allows the use of different column delimiters in a row. In such embodiment, a delimiter so used as a column delimiter may take precedence over a string delimiter when parsing the file if the same delimiter is used as a row delimiter and string delimiter.

In one embodiment, the top N scores that have a unique terminator delimiter are identified by selecting the highest, as described above, then the next highest, and so on, until N (e.g. 5) scores have been identified. Such scores and the delimiters corresponding to such scores are presented to the user, and one or more lines from the copy of the file are displayed for each score by parsing the file using the delimiter pattern and string delimiters corresponding to such scores. The user may select one of such scores, and the file is parsed using the pattern and any string delimiter corresponding to the score as described above.

In one embodiment, the terminator delimiter may be an ordered or non-ordered sequence of one or more tokens at the end of the pattern. In one embodiment, up to a fixed number of tokens, such as three tokens, may be used as the terminator delimiter, as long as each or the combination of the delimiters used are unique to the pattern.

At step 260 of FIG. 2B, the potential row delimiters from the various schemas are counted in the some or all of the copy of the file, and the potential row delimiter with the highest count is chosen. The potential column delimiters from the various schemas are counted in the copy of the file and the potential column delimiter with highest count is chosen 262. If the count of the column delimiter chosen is not greater than or equal to three times the account of the row delimiter chosen 264, delimiters are not assigned to the file 272, and the file is not parsed using assigned delimiters.

Otherwise, potential string delimiter pairs are matched in the file and matched pairs counted to identify the counts for each pair of string delimiters. Each pair of delimiters is matched as if it is the only pair of string delimiters, so that, for example, a pair of delimiters that are between the delimiters of another pair will be counted, and the pair of delimiters with the highest count is identified and compared to the next highest count of string delimiter pairs 266. If the count of the identified pair is not significantly greater (e.g. at least three times) than the count of the next highest string delimiter pair 268, no string delimiters are assigned to the file, and the file is parsed 254 using the row and column delimiters. Otherwise, the string delimiters and the row and column delimiters with the highest count are assigned to the file and the file is parsed 254 using the assigned delimiters.

In one embodiment, a number greater than one of one or both of potential row and column delimiters are identified in descending order of their count in the file, and combinations of such delimiters that meet the significantly greater criteria are displayed to the user, along with a few lines from the copy of the file parsed using these delimiters. Multiple string delimiters may also be selected and used in these combinations displayed to the user and used for parsing, as long as the count of that string delimiter is much greater than the count of the next highest counted string delimiter.

It is noted that there is no need for input about the file structure or origin used to attempt to identify delimiters according to the present invention.

Figure 3:
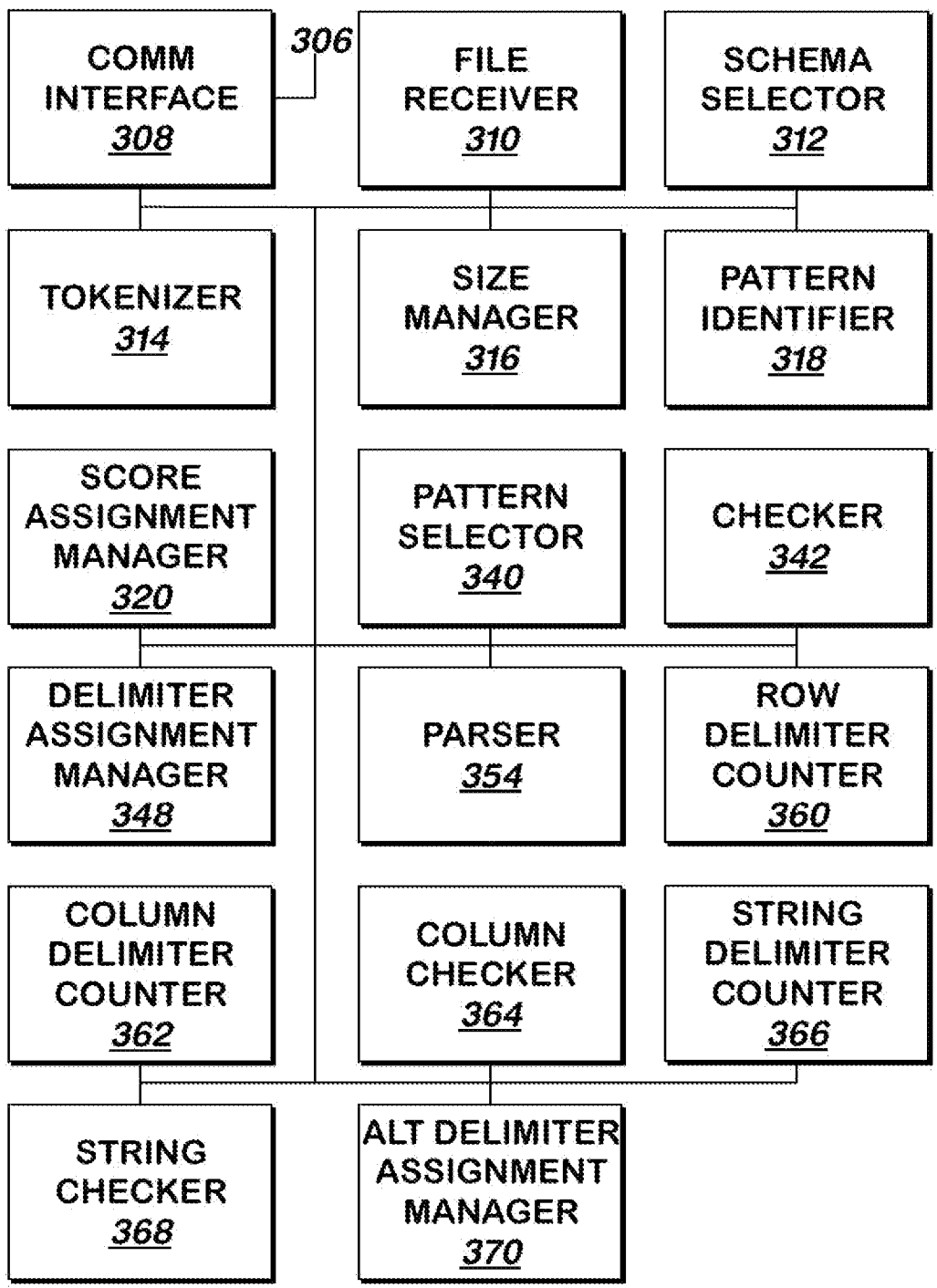
FIG. 3 is a block schematic diagram of a system for identifying delimiters in a file according to one embodiment of the present invention.

Referring now to FIG. 3, a method of parsing a file is shown according to one embodiment of the present invention.

Communication interface 308 includes a conventional communication interface running suitable communication protocols such as Ethernet, TCP/IP, or both. In one embodiment, unless otherwise noted herein, all communication in or out of the system of FIG. 3 is made via input/output 306 of communication interface 308. Input/output 306 may be coupled to an Ethernet, the Internet, or both.

File receiver 310 receives the file as described above, copies the first number of bytes of the file, and stores such copy in file storage 398. File receiver 310 then signals schema selector 312.

When signaled, schema selector 312 selects a schema from schema storage 394. Schema storage 394 contains the various schemas used as described herein, each containing a schema identifier, a list of potential row delimiters, a list of potential column delimiters, and a string delimiter, or an indication that no string delimiter is to be used for the schema. Schema selector 312 passes the schema identifier of the selected schema to tokenizer 314.

Tokenizer 314 tokenizes the copy in file storage 398 using the schema whose identifier was received from schema selector 312 as described above, and stores the tokenized copy and the schema identifier into file storage 398. Tokenizer 314 signals size manager 316 with the schema identifier it received.

As noted above, in one embodiment, tokenizer 314 tokenizes the copy of the file using each of the schemas stored in schema storage 394, one after the other, and stores the tokenized file along with the schema identifier into file storage 398. In such embodiment, tokenizer 314 is signaled by file receiver 310 (which does not signal schema selector 312) and performs such tokenization. Tokenizer 314 signals schema selector 312, which selects a schema and provides the schema selected to size manager 316.

Size manager 316 selects the initial size of two, and provides the schema identifier and the selected size to pattern identifier 318. Pattern identifier 318 identifies a most common repeating pattern or patterns for the size using the tokenized version of the file stored in file storage 398 corresponding to the schema identifier receives as described above, and provides the pattern or patterns, the size, optionally, the position of the first occurrence of the pattern in the tokenized version of the copy of the file, and the schema identifier to score assignment manager 320.

Score assignment manager 320 uses the tokenized version of the file stored in file storage 398 corresponding to the schema identifier it receives, and the size it receives, and optionally, the position of the first pattern in the tokenized version of the copy of the file to assign a score to each pattern as described above, and stores the score, the size, the pattern, and the schema identifier in score storage 396. Score assignment manager 320 signals size manager 316, which increments the size, compares it to the maximum size, and if the maximum size is not exceeded, provides the new size to pattern identifier 318, which repeats the process described above, using the new size. If the maximum size has been exceeded, size manager 316 signals schema selector 312, which identifies if there are more schemas to be selected, and if so, selects the next schema and provides it to tokenizer 314, or to size manager 316, which repeats the process described above using the newly selected schema.

If there are no more schemas to be selected, schema selector 312 signals pattern selector 340. When signaled, pattern selector 340 selects the pattern with the highest score as described above, optionally using the preferences described above. The information used for the preferences described above may be provided by pattern identifier 318 to score assignment manager 320 and stored with the pattern in score storage 316 and such information may be used by pattern selector 340 to select the pattern. Pattern selector 340 provides the schema identifier, score and pattern corresponding to that selected to checker 342, which checks to ensure the score is above the threshold and that the pattern has a unique terminator delimiter of one or more or tokens. If the score is above the threshold and the terminator delimiter is unique to the pattern, checker 342 provides the schema identifier, optionally, the score, and the pattern to delimiter assignment manager 348. If the terminator token or tokens are not unique to the pattern, checker 342 signals pattern selector 340, which selects the pattern with the next highest score and repeats the process.

In one embodiment, delimiter assignment manager 348 then signals pattern selector 340, which repeats the process of selecting the pattern with the next highest score as described above, until a threshold number of patterns have been identified in the manner described above, or no further patterns have a score above the threshold. In this embodiment, when checker 342 checks the score to determine if it is above the threshold, if the score is below the threshold, checker 342 so indicates to delimiter assignment manager 348, and delimiter assignment manager no longer signals pattern selector 342 to identify a pattern with the next highest score.

If the first pattern selected by pattern selector 340 contains a score below the threshold, checker 342 signals row delimiter counter 360, which operates as described in more detail below.

In the embodiment in which only one pattern is provided to delimiter assignment manager 348, delimiter assignment manager 348 checks the schema in schema storage 394 corresponding to the schema identifier received to determine whether the schema corresponds to a string delimiter. Delimiter assignment manager 348 provides the terminator token or tokens to parser 354 as the row delimiter, identifies the dominant other part of the pattern as the column delimiter, and provides such delimiters, and any string delimiter from the schema to parser 354. Parser 354 parses the file in file storage 398 using the delimiters it receives, and stores the parsed file in file storage 398.

In the embodiment in which multiple patterns are provided to delimiter assignment manager 348, delimiter assignment manager 348 provides to the user parsed sets of rows from the copy of the file stored in file storage 398 using each of the patterns, with the delimiters identified as described above, and allows the user to select one of the sets of rows. The delimiters corresponding to the set of rows selected by the user are provided to parser 354, which parses the file and stores the parsed file into file storage 398.

When signaled, row delimiter counter 360 uses the potential row delimiters in each of the schemas stored in schema storage 394 and counts in the copy of the file stored in file storage 398 the potential row delimiters as described above. Row delimiter counter 360 provides the one or more row delimiters with the highest counts and their counts to column delimiter counter 362. When it receives the counts and the delimiters, column delimiter counter 362 uses any of the schemas stored in schema storage 394 to identify potential column delimiters and counts the potential column delimiters in the copy of the file stored in file storage 398. Column delimiter counter 362 provides to column checker 364 the one or more column delimiters with the highest counts and their counts, and provides the row delimiters and their counts to call checker 364.

Column checker 364 identifies the combinations of row delimiters and column delimiters for which the column delimiters have counts that are at least a number of (e.g. three) times the row delimiters (or similar other criteria). If no such combination exists, column checker 364 selects one or more row delimiters with the highest count and provides them to delimiter assignment manager 348, with an indication that no column delimiter is to be assigned to the file. When it receives the row delimiters, delimiter assignment manager 348 parses the copy of the file stored in file storage 398 using each of the row delimiters it receives, and displays to the user several lines of the file for each such delimiter. The user may select one of the delimiters, and delimiter assignment manager 348 assigns such selected delimiter to the file, and provides it to parser 354. Parser 354 parses the file in file storage 398 using the row delimiter, and stores the parsed file in file storage 398.

In one embodiment, row delimiter counter 360 uses the highest row delimiter counted, and provides only such delimiters to column delimiter counter 362. If column checker 364 does not identify any column delimiters with a count greater than three times (or another threshold computed using) the count of the row delimiter, column checker 364 provides the row delimiter to delimiter assignment manager 348 with an indication that no column or string delimiters are to be assigned to the file, which assigns such delimiters to the file. Delimiter assignment manager 348 provides such row delimiter to parser 354, which parses the file using the row delimiter, and stores the parsed file in file storage 398.

If at least one column delimiter count meets the threshold multiple of at least one row delimiter count, column checker 364 provides such delimiters and counts, or the combinations of such delimiters and counts for which the threshold multiples apply, to string delimiter counter 366. String delimiter counter 366 matches and counts the potential string delimiter sets from all schemas stored in schema storage 394 as described above and provides the one or more string delimiter sets and their counts and the other delimiter counts or the combinations of delimiters and counts to string delimiter checker 368.

String delimiter checker 368 identifies the one or more string delimiters that have counts significantly greater than the other string delimiters, and if at least one such string delimiter is identified in this manner, string delimiter checker provides such identified string delimiters, as well as the row and column delimiter combinations of row delimiters and column delimiters to delimiter assignment manager 348. If no such string delimiters are identified, string delimiter checker 368 provides only the combinations of row and column delimiters but does not provide a string delimiter to delimiter assignment manager 348. Delimiter assignment manager 348 parses a few lines of the copy of the file stored in file storage 398 using each such combination of row, column and any string delimiters it receives, and displays each lines with the combinations of delimiters it used to parsed such lines. The user may select a combination of delimiters by viewing the parsed file lines and indicate the selected combination to delimiter assignment manager 348. Delimiter assignment manager 348 assigns the selected delimiters to the file, and provides the selected delimiters to parser 354, which parses the file using the delimiters it receives. Parser 354 outputs the parsed file to file storage 398.

SUMMARY

A method of parsing a file is shown, the method including providing at least one tokenizing schema; producing at least one tokenized version of the file, each tokenized version of the file being produced responsive to at least one tokenizing schema and the file, such that a token corresponding to a character in the at least one tokenizing schema is added to the tokenized version of the file responsive to the character being in the file; for each of a plurality of sizes, identifying in the tokenized version of the file, at least one pattern of delimiters that repeats in each of the at least one tokenized version of file, responsive to the size; computing, via a hardware processor, a score for each of the plurality of patterns of delimiters identified, responsive to how frequently each pattern of delimiters appears in the tokenized version of the file; selecting a pattern of delimiters from the plurality of patterns of delimiters identified responsive to the scores computed; and parsing the file responsive to the pattern of delimiters selected.

The method includes an optional feature, whereby the score for each pattern of delimiters is computed additionally responsive to a plurality of windows into the at least one tokenized version of the file.

The method includes an optional feature, whereby each of the plurality of windows has a size, and at least one of the plurality of windows used to compute the score for a pattern has a size different from another plurality of windows used to compute the score for the pattern, for each of the plurality of patterns.

The method includes an optional feature, whereby the selecting the pattern of delimiters step is responsive to a presence of at least one string delimiter in at least one of the plurality of patterns of delimiters.

The method includes an optional feature, whereby the selecting the pattern of delimiters step is responsive to, for each of at least some of the patterns of delimiters in the plurality of patterns of delimiters, an earliest location in the tokenized version of the file that said pattern is identified.

The method includes an optional feature, whereby the selecting the pattern of delimiters step is responsive to, for each of the plurality of patterns of delimiters, a locating of a set of at least one delimiter at the end of said pattern, at least some of which is not found in a remainder of that pattern.

A system for parsing a file is described, the system including: a schema selector having an input for receiving at least one tokenizing schema, the schema selector for providing at an output the at least one tokenizing schema received at the schema selector input; a tokenizer having an input coupled for receiving the file and coupled to the schema selector for receiving the at least one tokenizing schema, the tokenizer for producing and providing at an output at least one tokenized version of the file, each tokenized version of the file being produced responsive to at least one tokenizing schema and the file, such that a token corresponding to a character in the at least one tokenizing schema is added to the tokenized version of the file responsive to the character being in the file; a pattern identifier having an input coupled to the tokenizer output for receiving the tokenized version of the file, the pattern identifier for, for each of a plurality of sizes, identifying in the tokenized version of the file and providing at an output, at least one pattern of delimiters that repeats in each of the at least one tokenized version of file, responsive to the size, and for providing at an output the plurality of patterns of delimiters identified; a score assignment manager comprising a hardware processor, and having an input coupled to the pattern identifier output for receiving the plurality of patterns of delimiters identified, the score assignment manager for identifying how frequently each of said plurality of patterns of delimiters appears in the tokenized version of the file and for computing and providing at an output, for each of the plurality of patterns of delimiters, a score responsive to how frequently each pattern of delimiters appears in the tokenized version of the file, and the pattern of delimiters; a pattern selector having an input coupled to the score assignment manager output for receiving, for each of the plurality of patterns of delimiters, the score responsive to how frequently each pattern of delimiters appears in the tokenized version of the file and the pattern of delimiters, the pattern selector for selecting and providing at an output a pattern of delimiters from the plurality of patterns of delimiters responsive to the scores computed; and a parser having an input coupled to the pattern selector for receiving the pattern of delimiters, and for receiving the file, the parser for parsing the file responsive to the pattern of delimiters received at the parser input.

The system includes an optional feature, whereby the score assignment manager computes the score for each pattern of delimiters additionally responsive to a plurality of windows into the at least one tokenized version of the file.

The system: additionally optionally includes a size manager for assigning at an output a plurality of sizes to each of the plurality of windows; and includes an optional feature, whereby: the score assignment manager input is additionally coupled to the size manager for receiving the plurality of sizes; and the at least one of the plurality of windows used by the score assignment manager to compute the score for a pattern has a size different from another plurality of windows used to compute the score for the pattern, for each of the plurality of patterns.

The system includes an optional feature, whereby the pattern selector selects the pattern of delimiters responsive to a presence of at least one string delimiter in at least one of the plurality of patterns of delimiters.

The system includes an optional feature, whereby: the score assignment manager additionally identifies and provides at the output an indication of how early each of the plurality of patterns of delimiters is found in the tokenized version of the file; the pattern selector input is additionally for receiving the indication of how early each of the patterns of delimiters is found in the file; and the pattern selector selects the pattern of delimiters additionally responsive to, for each of at least some of the patterns of delimiters in the plurality of patterns of delimiters, the indication of how early said pattern of delimiters is found in the file.

The system includes an optional feature, whereby the pattern selector provides at least one other of the plurality of patterns of delimiters at the pattern selector output; additionally optionally includes a checker coupled to the pattern selector output for receiving wherein the at least one other of the plurality of patterns of delimiters, the checker for, for each of the at least one other of the plurality of patterns of delimiters, attempting to locate of a set of at least one delimiter at the end of said pattern, at least some of which is not found in a remainder of that pattern, and for providing at an output an indication of each said attempt; and includes an optional feature, whereby the pattern selector input is additionally coupled to the checker for receiving the at least one indication of each attempt; and the pattern selector selects the pattern of delimiters responsive to the at least one indication of each attempt.

A computer program product is described including a computer useable medium having computer readable program code embodied therein for parsing a file, the computer program product including computer readable program code devices configured to cause a computer system to: provide at least one tokenizing schema; produce at least one tokenized version of the file, each tokenized version of the file being produced responsive to at least one tokenizing schema and the file, such that a token corresponding to a character in the at least one tokenizing schema is added to the tokenized version of the file responsive to the character being in the file; for each of a plurality of sizes, identify in the tokenized version of the file, at least one pattern of delimiters that repeats in each of the at least one tokenized version of file, responsive to the size; computing, via a hardware processor, a score for each of the plurality of patterns of delimiters identified, responsive to how frequently each pattern of delimiters appears in the tokenized version of the file; select a pattern of delimiters from the plurality of patterns of delimiters identified responsive to the scores computed; and parse the file responsive to the pattern of delimiters selected.

The computer program product includes an optional feature, whereby the score for each pattern of delimiters is computed additionally responsive to a plurality of windows into the at least one tokenized version of the file.

The computer program product includes an optional feature, whereby each of the plurality of windows has a size, and at least one of the plurality of windows used to compute the score for a pattern has a size different from another plurality of windows used to compute the score for the pattern, for each of the plurality of patterns.

The computer program product includes an optional feature, whereby: the computer program product comprising computer readable program code devices configured to cause the computer system to select the pattern of delimiters are responsive to a presence of at least one string delimiter in at least one of the plurality of patterns of delimiters.

The computer program product includes an optional feature, whereby the computer program product comprising computer readable program code devices configured to cause the computer system to select the pattern of delimiters are responsive to, for each of at least some of the patterns of delimiters in the plurality of patterns of delimiters, an earliest location in the tokenized version of the file that said pattern is identified.

The computer program product includes an optional feature, whereby the computer program product comprising computer readable program code devices configured to cause the computer system to select the pattern of delimiters step are responsive to, for each of the plurality of patterns of delimiters, a locating of a set of at least one delimiter at the end of said pattern, at least some of which is not found in a remainder of that pattern.

What is claimed is:

1. A computer-implemented method of parsing a file, comprising:
  receiving a plurality of tokenizing schemas, each tokenizing schema specifying a plurality of delimiters;
  for each of the plurality of tokenizing schemas:
    generating a tokenized version of the file based on the tokenizing schema, the tokenized version of the file obtained by replacing characters of the file with tokens representing delimiters according to the tokenized schema;
    for each of a plurality of sizes, identifying in the tokenized version of the file, a pattern of delimiters that repeats in the tokenized version of file, the pattern having the size; and
    for each of the plurality of patterns of delimiters identified, determining a score based on a frequency with which the pattern of delimiters appears in the tokenized version of the file;
selecting a tokenizing schema from the plurality of tokenized schemas based on the scores of the plurality of patterns of delimiters associated with each of the plurality of tokenized schemas; and
parsing the file using the selected tokenizing schema.

2. The computer-implemented method of claim 1, further comprising:
selecting one or more characters corresponding to a terminator delimiter of the tokenizing schema as a row delimiter for the file, wherein the terminator delimiter is a sequence of one or more tokens at the end of a pattern.

3. The computer-implemented method of claim 2, method further comprising:
selecting one or more characters corresponding to a token other than the terminator token as a column delimiter for the file responsive to the other token being a most common token within the pattern of the selected tokenizing schema.

4. The computer-implemented method of claim 1, wherein the plurality of delimiters for each tokenizing schema comprises a potential string delimiter pair including an opening delimiter and a closing delimiter, wherein generating the tokenized version of the file skips characters between the opening delimiter and the closing delimiter.

5. The computer-implemented method of claim 4, wherein the plurality of delimiters for each tokenizing schema further comprises a potential row delimiter and a potential column delimiter, wherein generating the tokenized version of the file skips characters between the opening delimiter and the closing delimiter including potential row delimiters and potential column delimiters.

6. The computer-implemented method of claim 1, wherein the score for a particular pattern of a particular size is further based on a measure of a distance between the particular pattern of a particular size and tokens of the tokenized file in a sliding window having the particular size.

7. A computer system for parsing a file, comprising:
a computer processor; and
a non-transitory computer readable storage medium storing instructions for:
receiving a plurality of tokenizing schemas, each tokenizing schema specifying a plurality of delimiters;
for each of the plurality of tokenizing schemas:
generating a tokenized version of the file based on the tokenizing schema, the tokenized version of the file obtained by replacing characters of the file with tokens representing delimiters according to the tokenized schema;
for each of a plurality of sizes, identifying in the tokenized version of the file a pattern of delimiters that repeats in the tokenized version of file, the pattern having the size; and
for each of the plurality of patterns of delimiters identified, determining a score based on a frequency with which the pattern of delimiters appears in the tokenized version of the file;
selecting a tokenizing schema from the plurality of tokenized schemas based on the scores of the plurality of patterns of delimiters associated with each of the plurality of tokenized schemas; and
parsing the file using the selected tokenizing schema.

8. The computer system of claim 7, wherein the instructions stored in the non-transitory computer readable storage medium are further for:
selecting one or more characters corresponding to a terminator delimiter of the tokenizing schema as a row delimiter for the file, wherein the terminator delimiter is a sequence of one or more tokens at the end of a pattern.

9. The computer system of claim 8, wherein the instructions stored in the non-transitory computer readable storage medium are further for:
selecting one or more characters corresponding to a token other than the terminator token as a column delimiter for the file responsive to the other token being a most common token within the pattern of the selected tokenizing schema.

10. The computer system of claim 7, wherein the plurality of delimiters for each tokenizing schema comprises a potential string delimiter pair including an opening delimiter and a closing delimiter, wherein generating the tokenized version of the file skips characters between the opening delimiter and the closing delimiter.

11. The computer system of claim 10, wherein the plurality of delimiters for each tokenizing schema further comprises a potential row delimiter and a potential column delimiter, wherein generating the tokenized version of the file skips characters between the opening delimiter and the closing delimiter including potential row delimiters and potential column delimiters.

12. The computer system of claim 7, wherein the score for a particular pattern of a particular size is further based on a measure of a distance between the particular pattern of a particular size and tokens of the tokenized file in a sliding window having the particular size.

13. A non-transitory computer readable storage medium storing instructions for parsing a file, wherein the instructions are for:
receiving a plurality of tokenizing schemas, each tokenizing schema specifying a plurality of delimiters;
for each of the plurality of tokenizing schemas:
generating a tokenized version of the file based on the tokenizing schema, the tokenized version of the file obtained by replacing characters of the file with tokens representing delimiters according to the tokenized schema;
for each of a plurality of sizes, identifying in the tokenized version of the file, a pattern of delimiters that repeats in the tokenized version of file, the pattern having the size; and
for each of the plurality of patterns of delimiters identified, determining a score based on a frequency with which the pattern of delimiters appears in the tokenized version of the file;
selecting a tokenizing schema from the plurality of tokenized schemas based on the scores of the plurality of patterns of delimiters associated with each of the plurality of tokenized schemas; and
parsing the file using the selected tokenizing schema.

14. The non-transitory computer readable storage medium of claim 13, wherein the instructions stored in the non-transitory computer readable storage medium are further for:
selecting one or more characters corresponding to a terminator delimiter of the tokenizing schema as a row delimiter for the file, wherein the terminator delimiter is a sequence of one or more tokens at the end of a pattern.

15. The non-transitory computer readable storage medium of claim 14, wherein the instructions stored in the non-transitory computer readable storage medium are further for:

selecting one or more characters corresponding to a token other than the terminator token as a column delimiter for the file responsive to the other token being a most common token within the pattern of the selected tokenizing schema.

16. The non-transitory computer readable storage medium of claim 13, wherein the plurality of delimiters for each tokenizing schema comprises a potential string delimiter pair including an opening delimiter and a closing delimiter, wherein generating the tokenized version of the file skips characters between the opening delimiter and the closing delimiter.

17. The non-transitory computer readable storage medium of claim 16, wherein the plurality of delimiters for each tokenizing schema further comprises a potential row delimiter and a potential column delimiter, wherein generating the tokenized version of the file skips characters between the opening delimiter and the closing delimiter including potential row delimiters and potential column delimiters.

18. The non-transitory computer readable storage medium of claim 13, wherein the score for a particular pattern of a particular size is further based on a measure of a distance between the particular pattern of a particular size and tokens of the tokenized file in a sliding window having the particular size.

* * * * *